United States Patent
Moribe

(10) Patent No.: US 11,652,951 B2
(45) Date of Patent: May 16, 2023

(54) IMAGE PROCESSING APPARATUS, IMAGE PROCESSING METHOD, AND STORAGE MEDIUM FOR CORRECTING A MEASUREMENT VALUE USING A RECORDING ELEMENT THAT EJECTS INK

(71) Applicant: CANON KABUSHIKI KAISHA, Tokyo (JP)

(72) Inventor: Shoei Moribe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 142 days.

(21) Appl. No.: 17/191,258

(22) Filed: Mar. 3, 2021

(65) Prior Publication Data
US 2021/0283923 A1 Sep. 16, 2021

(30) Foreign Application Priority Data
Mar. 13, 2020 (JP) .............................. JP2020-044446

(51) Int. Cl.
*H04N 1/60* (2006.01)
*H04N 1/04* (2006.01)
*H04N 1/401* (2006.01)
*B41J 2/21* (2006.01)

(52) U.S. Cl.
CPC ........... *H04N 1/605* (2013.01); *H04N 1/0408* (2013.01); *H04N 1/4015* (2013.01); *H04N 1/6027* (2013.01); *B41J 2/2132* (2013.01); *B41J 2/2146* (2013.01)

(58) Field of Classification Search
None
See application file for complete search history.

(56) References Cited

U.S. PATENT DOCUMENTS

| 7,673,960 | B2 * | 3/2010 | Bastani | B41J 29/393 |
| | | | | 347/78 |
| 10,469,712 | B2 * | 11/2019 | Watanabe | H04N 1/2108 |
| 2010/0157342 | A1 * | 6/2010 | Nakano | B41J 2/2132 |
| | | | | 358/1.9 |
| 2012/0081443 | A1 * | 4/2012 | Ono | H04N 1/6038 |
| | | | | 347/15 |

FOREIGN PATENT DOCUMENTS

JP 2009239530 A 10/2009

\* cited by examiner

*Primary Examiner* — Scott A Rogers
(74) *Attorney, Agent, or Firm* — Canon U.S.A., Inc. IP Division

(57) ABSTRACT

An apparatus corrects a measurement value obtained by measuring a first image formed using a recording element that ejects ink, to identify a density characteristic of the recording element. The apparatus includes a first acquisition unit configured to acquire a second image obtained by measuring the first image, an identification unit configured to identify a boundary between regions in the second image, each of the regions corresponding to one of a plurality of head modules including the recording element, and a first correction unit configured to correct a measurement value of the second image based on the identified boundary.

19 Claims, 12 Drawing Sheets

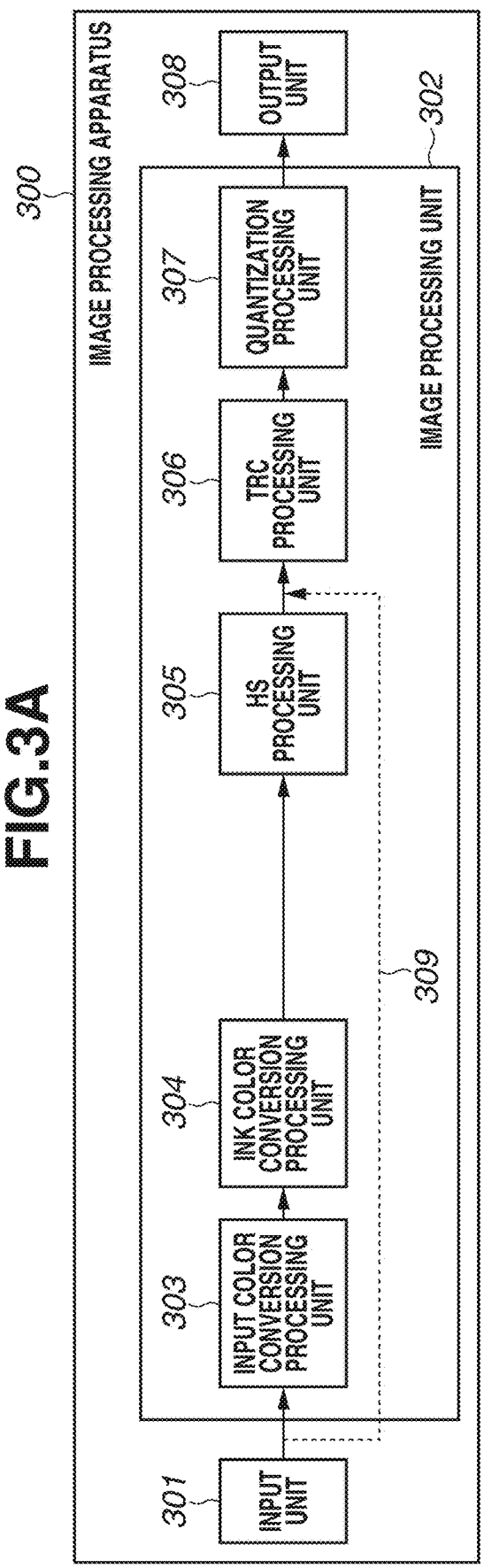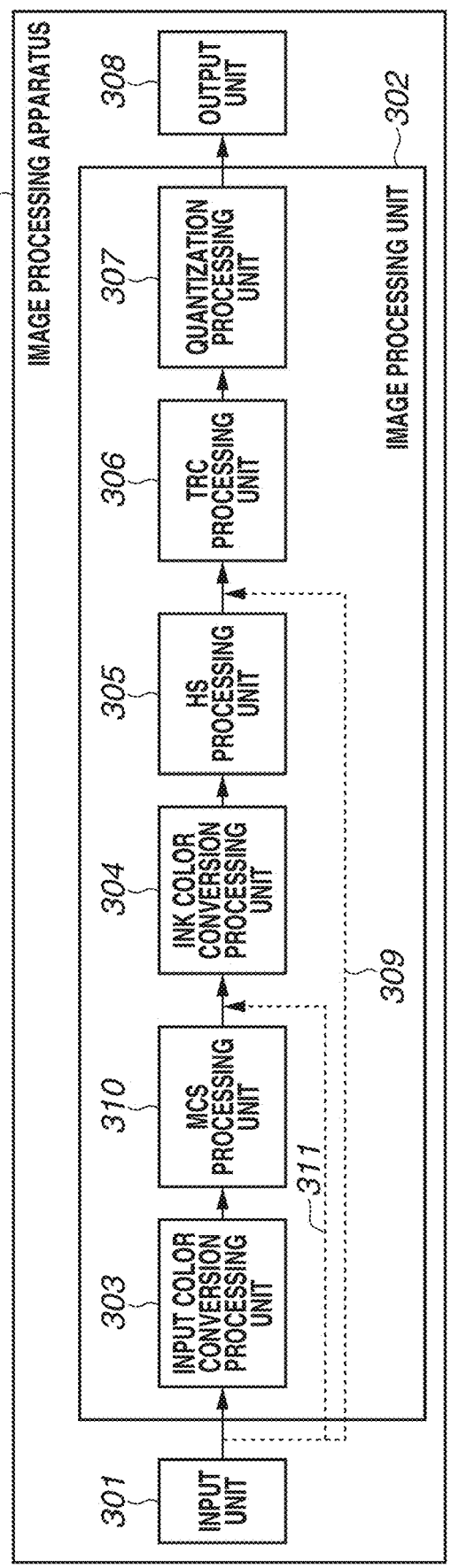

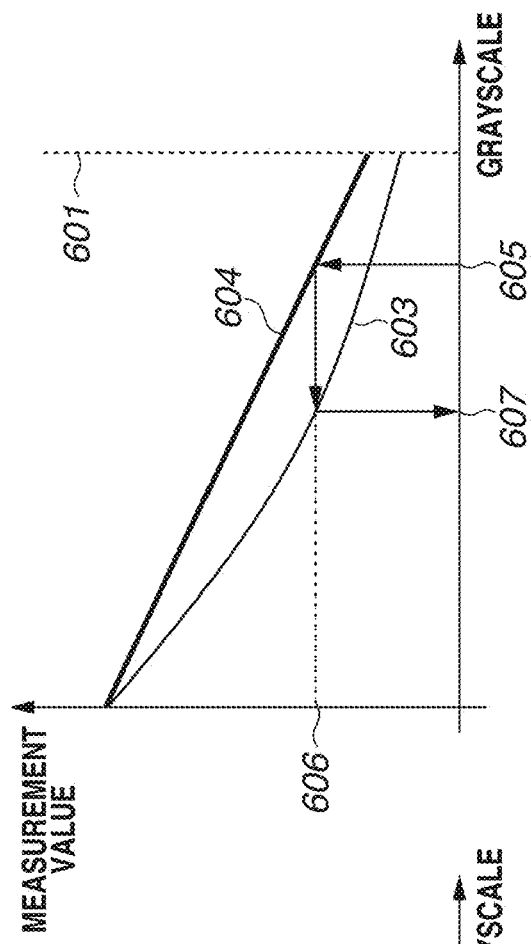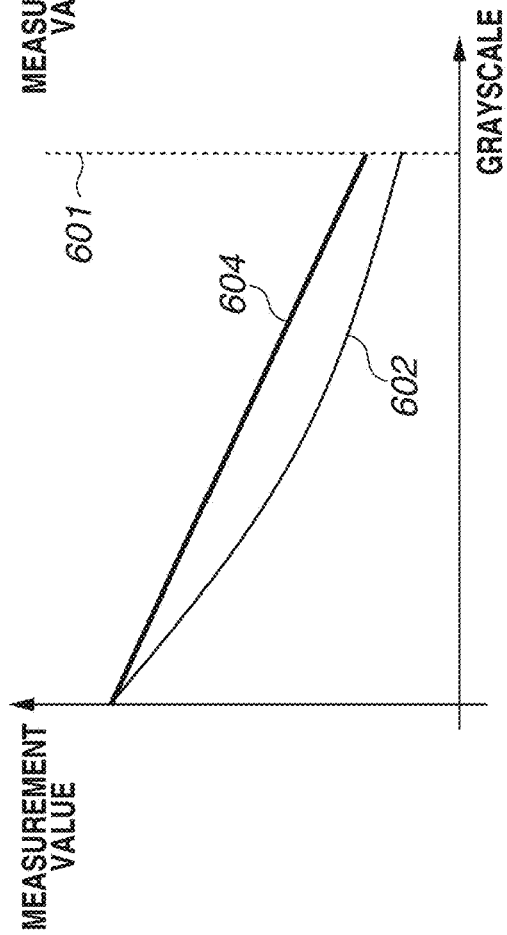

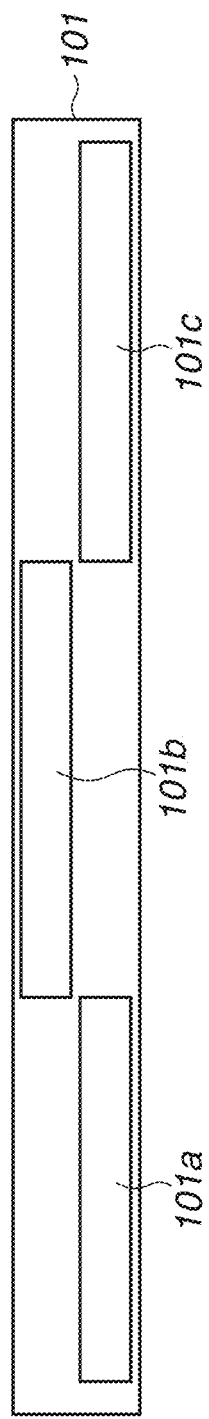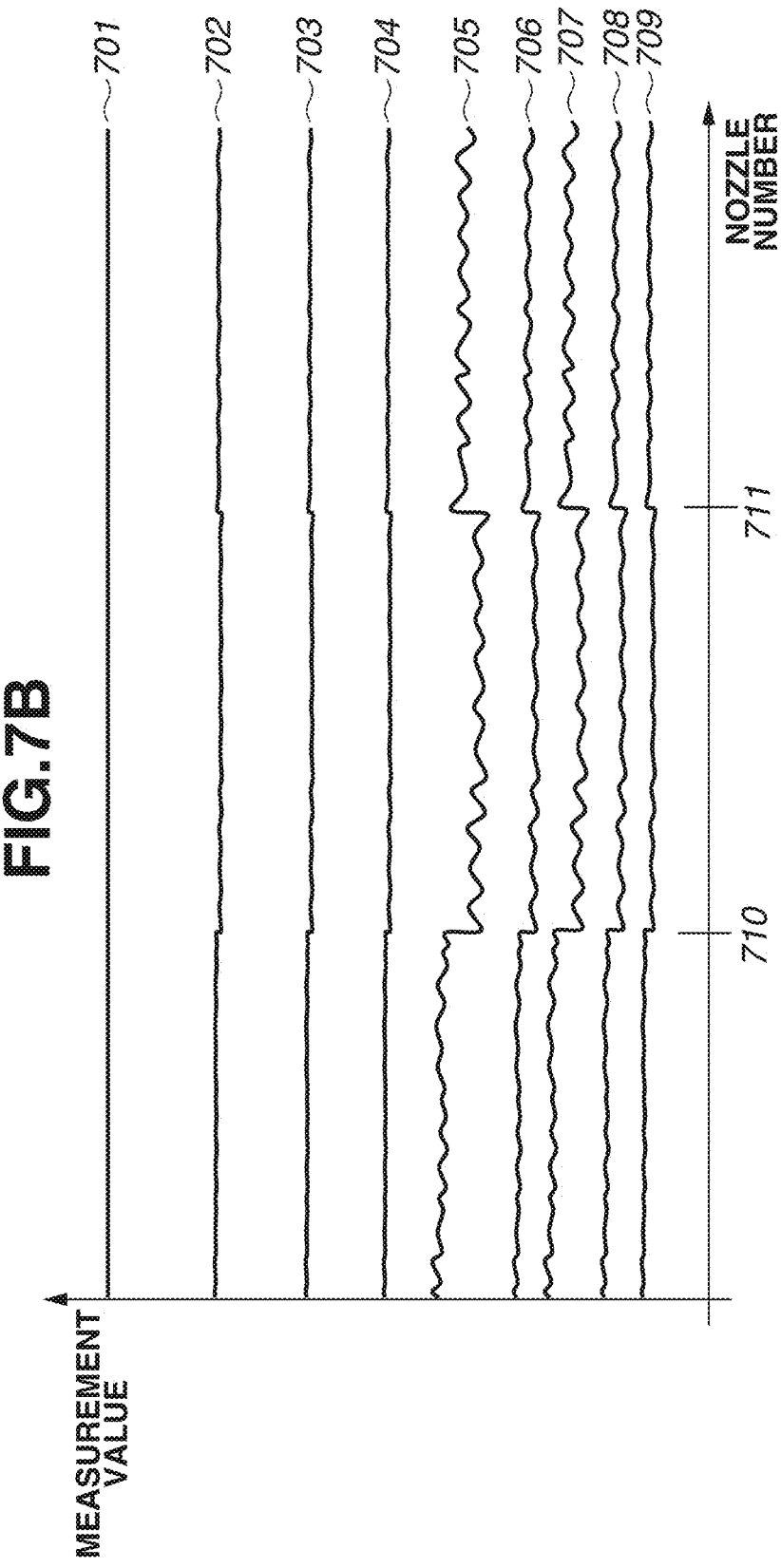

FIG.10
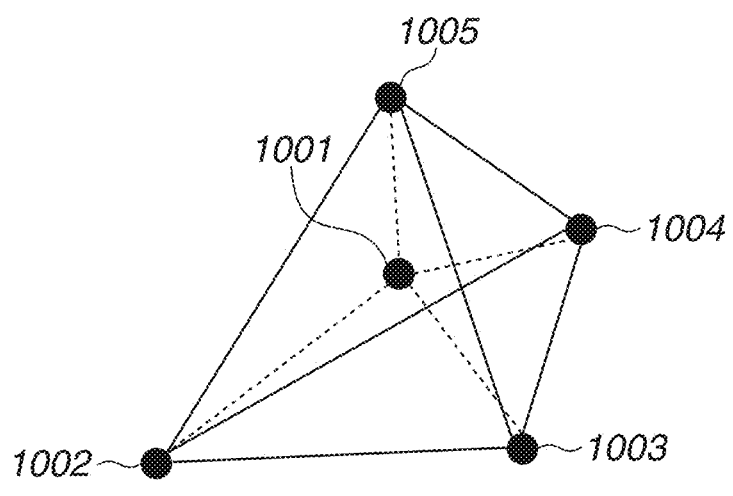
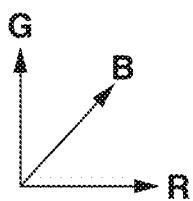

IMAGE PROCESSING APPARATUS, IMAGE PROCESSING METHOD, AND STORAGE MEDIUM FOR CORRECTING A MEASUREMENT VALUE USING A RECORDING ELEMENT THAT EJECTS INK

BACKGROUND OF THE DISCLOSURE

Field of the Disclosure

The aspect of the embodiments relates to an image processing technique of acquiring density characteristics of recording elements to reduce density unevenness and streaks that are generated on images formed by ink being ejected.

Description of the Related Art

Recording heads used in an inkjet printer each may have a plurality of recording elements (nozzles) that are different in ink ejection amounts from one another due to manufacturing error. Variations in ink ejection amounts are likely to create density unevenness on formed images. As a conventional technique of reducing density unevenness, there is known a head shading (HS) technique. The HS corrects image data based on information regarding an ink ejection amount of each recording element (the density characteristic of each recording element). The correction causes the number of ink dots to be ejected to be increased or decreased, adjusting the density of an image to be formed.

As a method used for acquiring the characteristics of recording elements, there is a method of printing patches (for example, uniform images for different tones) on a sheet surface and then measuring the patches using a scanner. At this time, the characteristic of a scanner may cause unevenness on a scanned image, reducing the accuracy of acquiring the density characteristics of the recording elements. Japanese Patent Application Laid-Open No. 2009-239530 discusses a technique of reading a printed image using a scanner and then applying a low-pass filter in consideration of the sense of sight of humans to the read image.

In Japanese Patent Application Laid-Open No. 2009-239530, a filter is applied to all measurement values. However, in some printer or scanner configurations, characteristics of measurement values may vary between regions in the read data. If a filter is applied to the measurement values without considering the variations, the correction accuracy declines adjacent to the boundaries between the regions.

SUMMARY OF THE DISCLOSURE

According to an aspect of the embodiments, an apparatus corrects a measurement value obtained by measuring a first image formed using a recording element that ejects ink, to identify a density characteristic of the recording element. The apparatus includes a first acquisition unit configured to acquire a second image obtained by measuring the first image, an identification unit configured to identify a boundary between regions in the second image, each of the regions corresponding to one of a plurality of head modules including the recording element, and a first correction unit configured to correct a measurement value of the second image based on the identified boundary.

Further features of the disclosure will become apparent from the following description of exemplary embodiments with reference to the attached drawings.

BRIEF DESCRIPTION OF THE DRAWINGS

FIGS. 3A and 3B are block diagrams each illustrating a functional configuration of an image processing apparatus.

FIGS. 6A and 6B are graphs for illustrating HS processing.

FIG. 7A is a diagram illustrating an example of a configuration of a recording head, and FIG. 7B is a diagram illustrating an example of measurement values obtained through a measurement of a measurement image.

FIG. 10 is a diagram for illustrating MCS processing.

DESCRIPTION OF THE EMBODIMENTS

Exemplary embodiments will be described below with reference to the drawings. The following exemplary embodiments are not intended to limit the disclosure. In addition, not all the combinations of features described in the following exemplary embodiments are essential to the solution in the disclosure.

In a first exemplary embodiment, the description will be given of a method of acquiring density characteristics of recording elements of an image forming apparatus that forms images onto recording media, in an image forming system including the image forming apparatus and a host apparatus that controls the image forming apparatus. In the image forming system, density characteristics of recording elements are acquired based on the control of the host apparatus. The following is a description of an inkjet printer as the image forming apparatus and a personal computer (PC) as the host apparatus.

<Configuration of Image Forming Apparatus>

Figure 1:
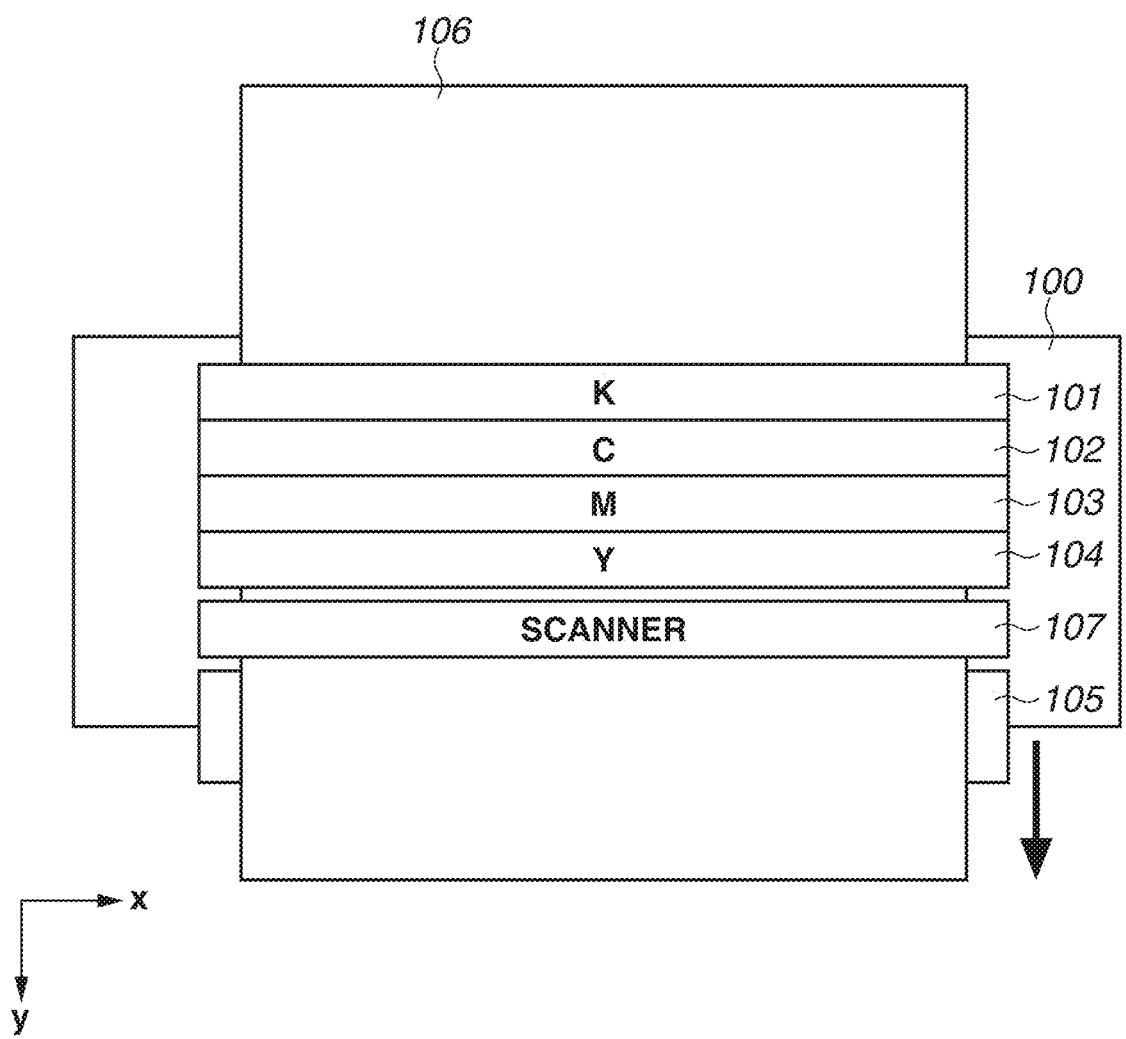
FIG. 1 is a diagram schematically illustrating a configuration of an image forming apparatus.

FIG. 1 is a diagram schematically illustrating a configuration of the image forming apparatus according to the present exemplary embodiment. The image forming apparatus according to the present exemplary embodiment is an inkjet printer. As illustrated in FIG. 1, an image forming apparatus 100 includes recording heads 101, 102, 103, and 104. The recording heads 101 to 104 each include a plurality of nozzles for ejecting ink that are arrayed in a predetermined direction within a range corresponding to the width of a recording sheet 106. In other words, the recording heads 101 to 104 according to the present exemplary embodiment are full-line type recording heads. The recording head 101 is a recording head for ejecting black (K) ink and the recording head 102 is a recording head for ejecting cyan (C) ink. The recording head 103 is a recording head for ejecting magenta (M) ink and the recording head 104 is a recording head for ejecting yellow (Y) ink. Intervals between nozzles matches 1200 dots per inch (dpi) resolution.

The recording sheet 106 as a recording medium is conveyed in an arrow direction illustrated in FIG. 1, by a conveyance roller 105 (and other rollers (not illustrated)) being rotated by the drive force of a motor (not illustrated). While the recording sheet 106 is being conveyed, ink is ejected from a plurality of nozzles of each of the recording heads 101 to 104 based on recording data. An image corresponding to one raster that corresponds to a nozzle line of each recording head is thereby formed sequentially. In addition, a scanner 107 is disposed downstream of the recording heads 101 to 104 in the y direction. The scanner 107 has reading elements arrayed at predetermined intervals, parallel to the recording heads 101 to 104. The scanner 107 can read an image formed with the recording heads 101 to 104, and output the read image as multivalued data including color signal values. Repeating the above-described operation of ejecting ink from each recording head onto a recording sheet being conveyed, for example, forms an image corresponding to one page.

The image forming apparatus according to the present exemplary embodiment is a full-line type image forming apparatus. In other embodiments, a so-called serial-type image forming apparatus that moves a recording head in the direction intersecting with the conveyance direction of a recording sheet at right angles may be used.

<Configuration of Image Forming System>

Figure 2:
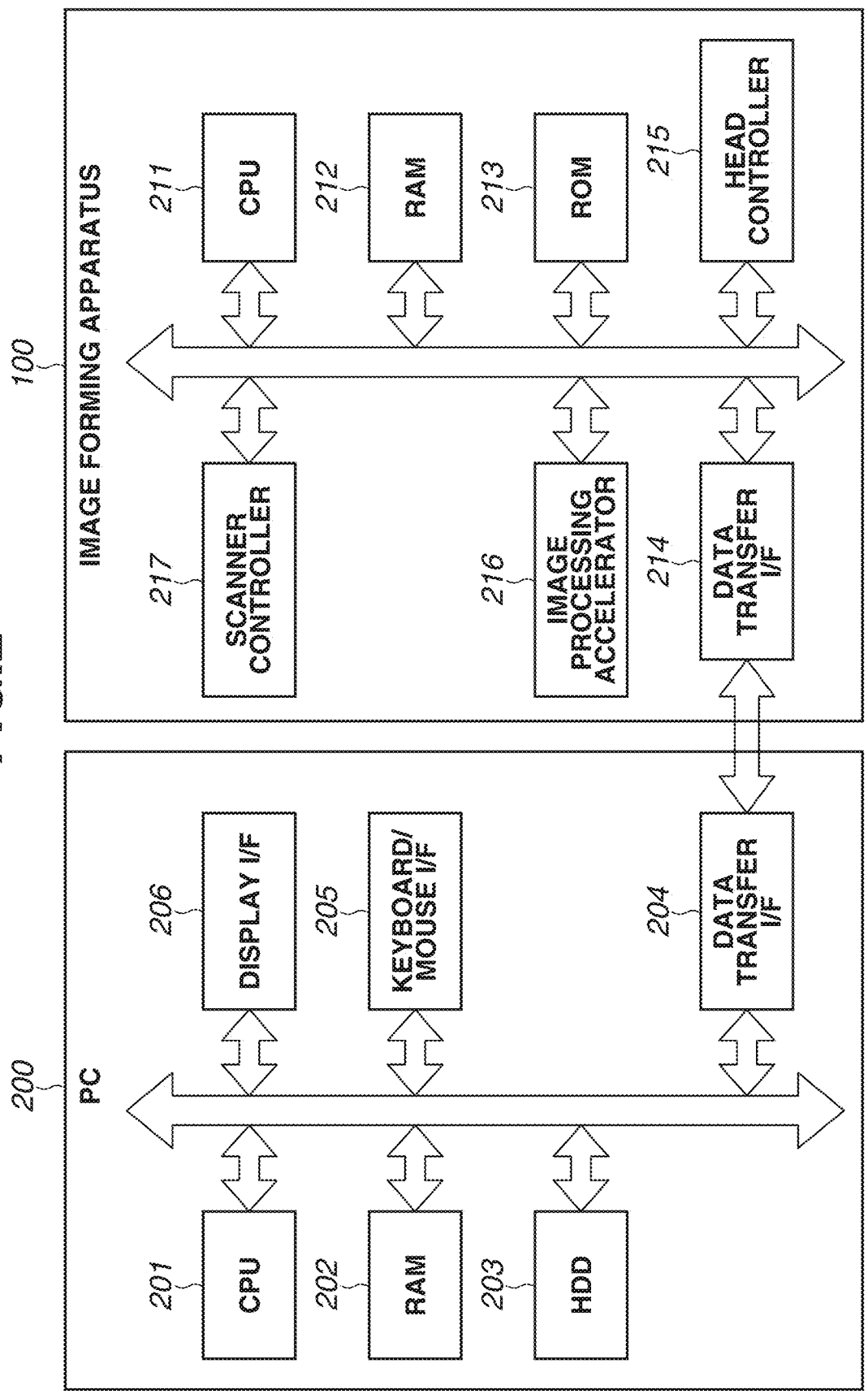
FIG. 2 is a block diagram illustrating a configuration of an image forming system.

FIG. 2 is a block diagram illustrating a configuration of the image forming system according to the present exemplary embodiment. As illustrated in FIG. 2, the image forming system according to the present exemplary embodiment includes the image forming apparatus 100 illustrated in FIG. 1, and a PC 200 as a host apparatus for the image forming apparatus 100.

The PC 200 includes a central processing unit (CPU) 201, a random access memory (RAM) 202, a hard disk drive (HDD) 203, a data transfer interface (I/F) 204, a keyboard/mouse I/F 205, and a display I/F 206. Following programs stored in the HDD 203 and the RAM 202, the CPU 201 executes various types of processing. In particular, the CPU 201 runs programs to execute processing of an image processing apparatus 300 according to the exemplary embodiments which will be described below. The RAM 202 is a volatile storage to temporarily store programs and data. In addition, the HDD 203 is a nonvolatile storage, and can store programs and table data to be generated by processing according to exemplary embodiments which will be described below. The data transfer I/F 204 controls data transmission and reception between the PC 200 and the image forming apparatus 100. A universal serial bus (USB), the IEEE1394, or a local area network (LAN) can be used for connection used in data transmission and reception. The keyboard/mouse I/F 205 is an interface that controls a human interface device (HID) such as a keyboard or a mouse. A user performs input via the keyboard/mouse I/F 205. The display I/F 206 controls display on a display (not illustrated).

The image forming apparatus 100 includes a CPU 211, a RAM 212, a read-only memory (ROM) 213, a data transfer I/F 214, a head controller 215, an image processing accelerator 216, and a scanner controller 217. The CPU 211 follows programs stored in the ROM 213 and the RAM 212 to execute processing. The RAM 212 is a volatile storage to temporarily store programs and data. In addition, the ROM 213 is a nonvolatile storage, and stores data and programs. The data transfer I/F 214 controls data transmission and reception between the image forming apparatus 100 and the PC 200. The head controller 215 feeds recording data to the recording heads 101 to 104 illustrated in FIG. 1, and controls the ejection operations of the recording heads 101 to 104. Specifically, the head controller 215 can be configured to read control parameters and recording data from predetermined addresses of the RAM 212. If the CPU 211 writes control parameters and recording data into the corresponding predetermined addresses of the RAM 212, processing is started by the head controller 215, and ink ejection from the recording heads is performed. The CPU 211 also serves as a formation control unit for forming a measurement image to be described below. The image processing accelerator 216 executes image processing at higher speed than the CPU 211. Specifically, the image processing accelerator 216 can be configured to read parameters and data for image processing, from predetermined addresses of the RAM 212. If the CPU 211 writes parameters and data into the corresponding predetermined addresses of the RAM 212, the image processing accelerator 216 is started to perform predetermined image processing. The image processing accelerator 216 may not be included, the CPU 211 executing processing depending on the specifications of the image forming apparatus 100. While controlling the reading elements of the scanner 107 illustrated in FIG. 1, the scanner controller 217 outputs data obtained in the reading process to the CPU 211.

<Functional Configuration of Image Processing Apparatus>

FIG. 3A is a block diagram illustrating a functional configuration of the image processing apparatus 300 included in the PC 200. The image processing apparatus 300 includes an input unit 301, an image processing unit 302, and an output unit 308.

As illustrated in FIG. 3A, the input unit 301 inputs image data and outputs the image data to the image processing unit 302. The image processing unit 302 includes an input color conversion processing unit 303, an ink color conversion processing unit 304, and a head shading (HS) processing unit 305. The image processing unit 302 further includes a tone reproduction curve (TRC) processing unit 306 and a quantization processing unit 307.

The input color conversion processing unit 303 converts input image data acquired from the input unit 301, into image data suitable for the color reproduction range of a printer. The input image data in the present exemplary embodiment is data indicating (R, G, B) coordinates in the sRGB color space, which is a color space suitable for displays. The sRGB color space is a space represented by R, G, and B axes, and each coordinate is represented by eight-bit values. Thus, input image data is image data represented by an eight-bit value of each of R, G, and B. The input color conversion processing unit 303 converts an input color signal value of each of R, G, and B of the input image data, into the corresponding printer color signal value of each of R', G', and B' suitable for the color reproduction range of the printer. In the following description, respective R, G, and B color signal values will be expressed as an (R, G, B) color signal value. The conversion is performed by a known method such as matrix calculation processing or processing that uses a three-dimensional look-up table (LUT). In the present exemplary embodiment, the conversion processing is performed using a three-dimensional LUT and through interpolation calculation. The resolution of eight-bit image data handled in the image processing unit 302 is 1200 dpi.

The ink color conversion processing unit 304 performs conversion processing of converting color signal values of image data that have been converted by the input color conversion processing unit 303, into color signal values for a plurality of types of ink. Because the image forming apparatus 100 uses black (K), cyan (C), magenta (M), and yellow (Y) inks, an (R', G', B') printer color signal value is converted into a corresponding (K, C, M, Y) ink color signal value. The values of K, C, M, and Y are also each represented by an eight-bit value similarly to the values of R, G, and B. Similarly to the input color conversion processing unit 303, the ink color conversion processing unit 304 performs conversion processing using a three-dimensional LUT and through interpolation calculation.

Figure 12:
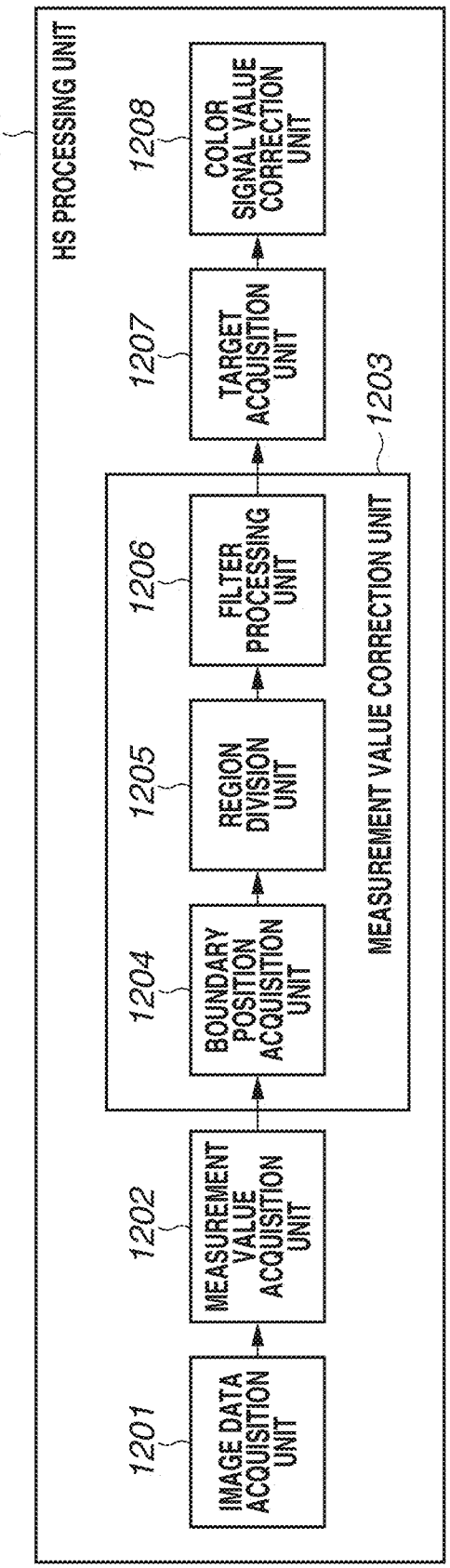
FIG. 12 is a block diagram illustrating a functional configuration of an HS processing unit.

The HS processing unit 305 performs correction suitable for the density characteristic of each nozzle included in a recording head, on the image data having the (K, C, M, Y) ink color signal values. FIG. 12 is a diagram illustrating a detailed functional configuration of the HS processing unit 305. The HS processing unit 305 includes an image data acquisition unit 1201, a measurement value acquisition unit 1202, a measurement value correction unit 1203, a target acquisition unit 1207, and a color signal value correction unit 1208. The measurement value correction unit 1203 includes a boundary position acquisition unit 1204, a region division unit 1205, and a filter processing unit 1206. The HS processing unit 305 according to the present exemplary embodiment calculates the density characteristic of each nozzle using data obtained by a measurement image being read, and executes correction processing on the image data using the calculated density characteristic of each nozzle. The details of the HS processing executed by the HS processing unit 305 will be described below.

The TRC processing unit 306 adjusts, for each ink color, the number of ink dots to be recorded by the image forming apparatus 100 with respect to image data having the (K', C', M', Y') HS color signal values obtained by the HS processing. Specifically, the TRC processing unit 306 corrects the image data in such a manner that the number of dots to be recorded onto a recording medium has a linear relationship with the brightness obtained by the recorded dots. The correction adjusts the number of dots to be recorded onto a recording medium.

The quantization processing unit 307 performs quantization processing (halftone processing) on the image data having the (K", C", M", Y") TRC color signal values obtained by the TRC processing to generate binary data in which each pixel value is represented by a one-bit value. The binary data as recording data indicates the arrangement of ink dots to be ejected. In the present exemplary embodiment, quantization processing is performed using a known dither method. Alternatively, a known error diffusion method may be used.

The output unit 308 outputs the binary data obtained by the quantization processing, to the image forming apparatus 100. The image forming apparatus 100 drives a recording head based on the input binary data, and forms an image by ejecting ink drops of each color onto a recording medium.

<Processing Executed by Image Processing Apparatus>

Figure 11A:
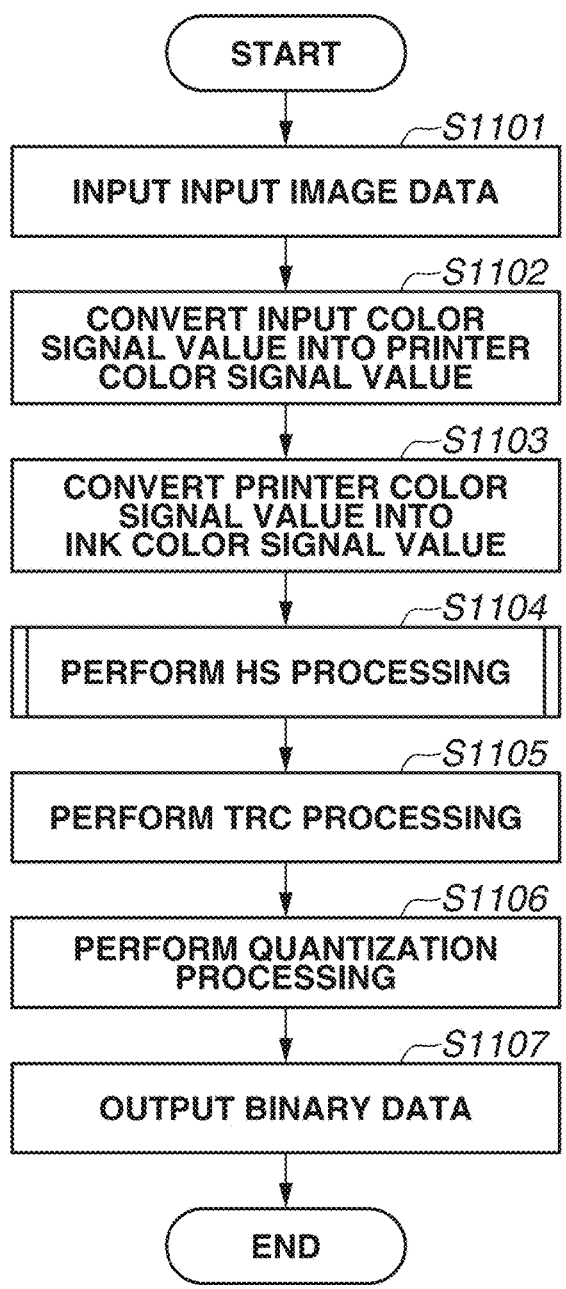
FIGS. 11A and 11B are flowcharts illustrating processing executed by the image forming system.

FIG. 11A is a flowchart illustrating processing executed by the image processing apparatus 300. The following is a description of detailed processing executed by the image processing apparatus 300 with reference to FIG. 11A. In the following description, the letter "S" is added to the beginning of the step number of each step (process).

In step S1101, the input unit 301 inputs input image data and outputs the input image data to the image processing unit 302. In step S1102, the input color conversion processing unit 303 converts the input (R, G, B) color signal values of the input image data into (R', G', B') printer color signal values for the color reproduction range of the printer. In step S1103, the ink color conversion processing unit 304 converts the (R', G', B') printer color signal values into (K, C, M, Y) ink color signal values for a plurality of types of ink. In step S1104, the HS processing unit 305 performs HS processing on the image data having the (K, C, M, Y) ink color signal values. In step S1105, the TRC processing unit 306 performs TRC processing on the image data having the (K', C', M', Y') HS color signal values obtained by the HS processing. In step S1106, the quantization processing unit 307 performs quantization processing on the image data having the (K", C", M", Y") TRC color signal values obtained by the TRC processing. In step S1107, the output unit 308 outputs the binary data generated by the quantization processing, to the image forming apparatus 100.

<HS Processing>

Figure 4:
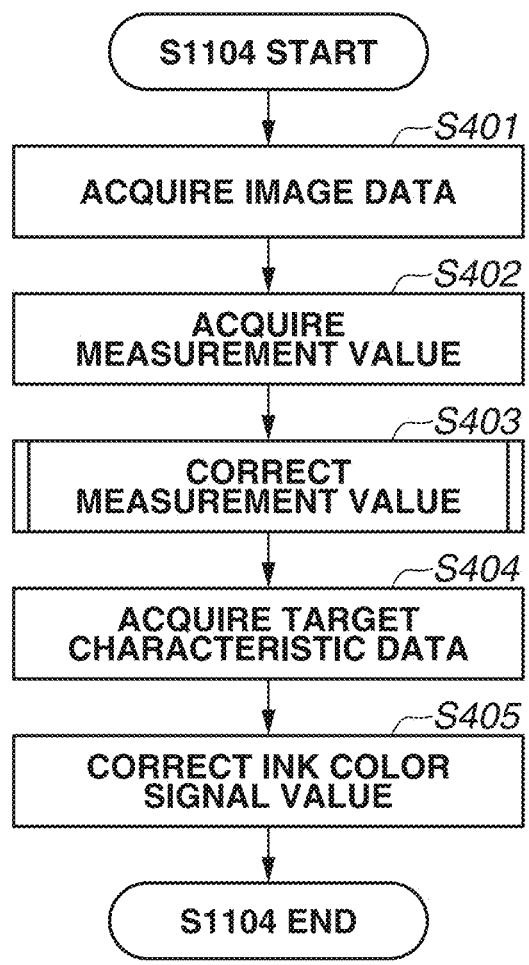
FIG. 4 is a flowchart illustrating head shading (HS) processing.

FIG. 4 is a flowchart illustrating HS processing executed by the HS processing unit 305. The following will describe the details of the HS processing with reference to FIG. 4.

In step S401, the image data acquisition unit 1201 acquires the image data having the (K, C, M, Y) ink color signal values output by the ink color conversion processing unit 304. In step S402, the measurement value acquisition unit 1202 acquires measurement values for identifying the density characteristic of each nozzle. The measurement values are acquired as image data by preliminarily measuring a measurement image using the scanner 107, and stored into the HDD 203.

Figure 5:
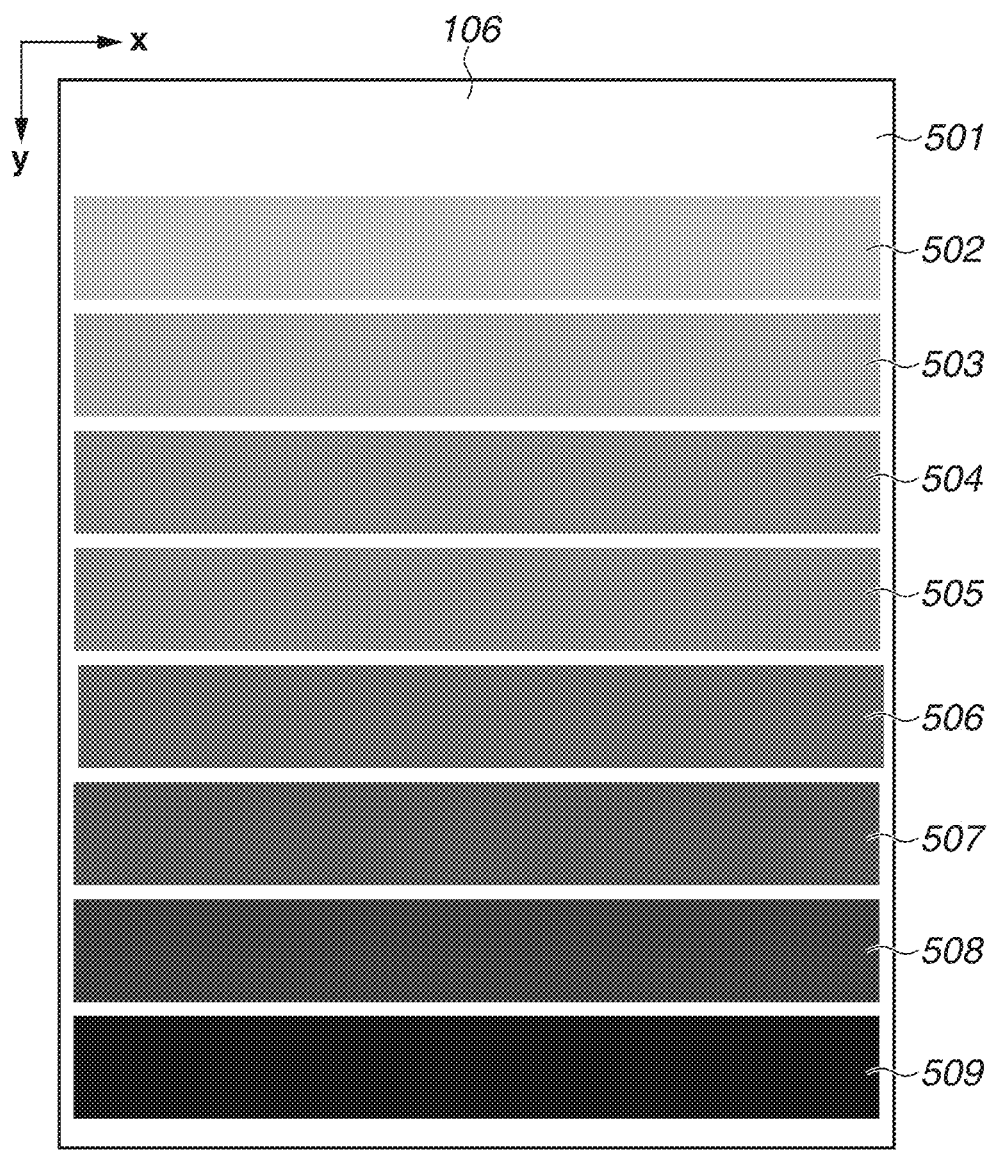
FIG. 5 is a diagram illustrating an example of a measurement image.

The following is a description of a method of generating image data having measurement values. First of all, a measurement image is formed on the recording sheet 106 to acquire the density characteristic of each nozzle. FIG. 5 illustrates an example of the measurement image. Nine patches of different tones that correspond to patches 501, 502, 503, 504, 505, 506, 507, 508, and 509 are formed on the recording sheet 106. Each patch is formed in a single color ink. The following description will be given of an example in which patches are formed using the recording head 101 (K ink). In the present exemplary embodiment, a single color ink alone is used in the processing performed in forming a measurement image, the processing of which passes along a bypass route 309 indicated by a broken line in FIG. 3A. This configuration enables the input image data to be directly input to the TRC processing unit 306 without passing through the input color conversion processing unit 303, the ink color conversion processing unit 304, and the HS processing unit 305.

Next, the measurement image is read by the scanner 107 and the scanned image is acquired by the reading. Each pixel value of the scanned image is acquired through three, or (R, G, B), channels. Next, using a color conversion table prepared in advance based on the color characteristic of the scanner, the scanned image is converted into a scanned image in which each pixel has a pixel value of one channel. In the present exemplary embodiment, the pixel values of the scanned image are converted into 16-bit values that have a linear relationship with the Y coordinates in the CIEXYZ color space. The pixel values in the scanned image after the color conversion can be represented by any color space, such as L* of CIEL*a*b* or density. In addition, when a measurement image is formed using a color ink of C, M, or Y, the values indicating color saturation can also be used in place of the values indicating brightness. For example, each of R, G, and B values may be used as a value corresponding to the corresponding color of the C, M, and Y complementary colors. In the present exemplary embodiment, the resolution of scanned images is 1200 dpi. The above-described processing produces image data having pixel values of a scanned image as measurement values, and in step S402, the image data is acquired.

In step S403, the measurement value correction unit 1203 corrects the measurement values acquired in step S402. The details of the processing of correcting measurement values will be described below. In step S404, the target acquisition unit 1207 acquires target characteristic data indicating a target characteristic suited to a measurement curve generated based on the corrected measurement values. In this example, the target characteristic is a target density characteristic predefined suitable for a measurement curve of the nozzles. As illustrated in FIG. 6A, the horizontal axis represents the grayscale and the vertical axis represents the brightness. In FIG. 6A, a linear straight line with respect to the grayscale is a target characteristic 604. A dotted line 601 is at the upper limit value on the horizontal axis, the upper limit value in the present exemplary embodiment of which is 255 since input signal values are eight-bit values. Plotting the measurement values of the scanned image provided with the different tone patches 501 to 509 and then performing interpolation calculation with them produces a measurement curve 602. Known piecewise linear interpolation is used for interpolation calculation in the present exemplary embodiment. A known spline curve may be used as a measurement curve. The measurement curve 602 represents the density characteristic of the nozzle at each pixel position x, and the number of curves obtained is the same as the number of nozzles used in the measurement image formation. The measurement curve varies with the nozzle density characteristic. For example, the curve of a nozzle with a smaller ink ejection amount shifts upward (brighter direction). In each tone, measurement values of the tone are obtained within the width in the y direction of the patch. Thus, the average value of the measurement values in the y direction in each tone is used for the generation of a measurement curve; the total number of average values is nine.

In step S405, the color signal value correction unit 1208 corrects the (K, C, M, Y) ink color signal values of the image data acquired in step S401, based on the measurement values calculated in step S403, and acquires (K', C', M', Y') HS color signal values. The acquisition of the (K', C', M', Y') HS color signal values will be described with reference to FIG. 6B. In FIG. 6B, an input value 605 indicates a (K, C, M, Y) ink color signal value. The color signal value correction unit 1208 acquires the value in a target characteristic 604 that corresponds to the input value 605, and sets the acquired value as a target value 606. Furthermore, the color signal value correction unit 1208 acquires a signal value 607 on a measurement curve 603 that corresponds to the target value 606, as a corrected (K', C', M', Y') HS color signal value. The measurement curve 603 used here is a measurement curve obtained through piecewise linear interpolation on the measurement values corrected in step S403.

<Processing of Correcting Measurement Value>

The following is a detailed description of processing of correcting measurement values. FIG. 7A is a schematic diagram illustrating a configuration of the recording head 101. The recording head 101 includes combined three head modules: a head module 101*a*, a head module 101*b*, and a head module 101*c*.

FIG. 7B illustrates an example of the measurement values of the measurement image illustrated in FIG. 5. The horizontal axis of the graph illustrated in FIG. 7B represents the number of each of all the nozzles of the recording head 101. In addition, the vertical axis of the graph represents signal values of the scanned image. Measurement values 701, 702, 703, 704, 705, 706, 707, 708, and 709 are obtained from the patches 501 to 509, respectively, illustrated in FIG. 5. As described above, in each tone, measurement values in a patch are obtained within the width in the y direction. FIG. 7B illustrates the average value of the measurement values in the y direction in each tone. In addition, a boundary 710 indicates the position of the boundary between the head module 101*a* and the head module 101*b*. A boundary 711 indicates the position of the boundary between the head module 101*b* and the head module 101*c*.

As illustrated in FIG. 7B, it can be seen that step-like discontinuous points are generated in the measurement values at the boundaries 710 and 711. These discontinuous points are generated when one head module on either side of a boundary has an ink ejection amount significantly different from that of the other head module. In the example illustrated in FIG. 7B, the ink ejection amount of the head module 101*b* is larger and the measurement values of the head module 101*b* are smaller (darker) as compared with the other head modules.

In view of the foregoing, the HS processing unit 305 according to the present exemplary embodiment identifies boundary portions in the configuration of the recording head 101, and performs filter processing suitable for the boundary portions on the measurement values.

Figure 8:
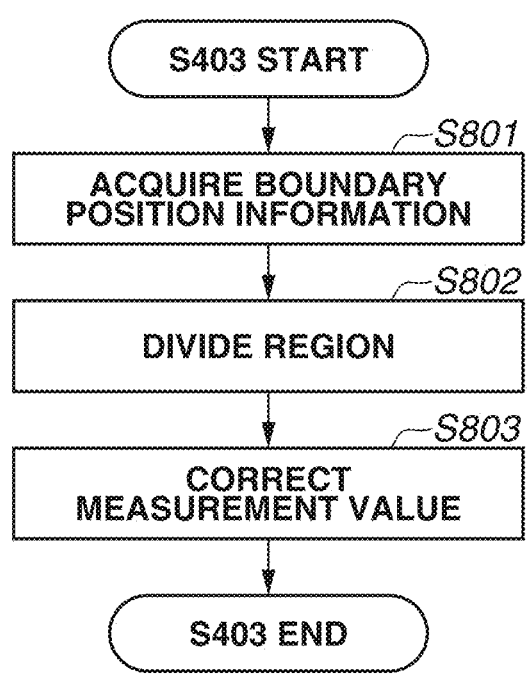
FIG. 8 is a flowchart illustrating processing of correcting measurement values.

FIG. 8 is a flowchart illustrating processing of correcting measurement values in the HS processing unit 305. In step S801, the boundary position acquisition unit 1204 acquires boundary position information indicating positions in a scanned image that corresponds to boundary positions between head modules. In step S802, the region division unit 1205 divides the scanned image at the boundary positions indicated by the boundary position information. The region division unit 1205 according to the present exemplary embodiment divides the scanned image at the boundaries 710 and 711, thereby providing the measurement values of three regions respectively corresponding to the three head modules.

In step S803, the filter processing unit 1206 corrects measurement values of each divided region. Specifically, the filter processing unit 1206 performs noise reduction processing using a low-pass filter on each divided region. The filter used in the present exemplary embodiment is a one-dimensional average value filter variable in size in the x direction. For example, if a filter size is three, the filter processing is performed so that the measurement value of a target pixel is the average value of three measurement values: one measurement value that corresponds to the target pixel and the other two measurement values that correspond to the two pixels adjacent to the target pixel in the x direction. Filter processing on each divided region is performed on each of the measurement values 701 to 709. Each of the measurement values 701 to 709 subjected to filter processing is an average value of measurement values in the y direction in the corresponding tone. At the end portions of each region excluding a portion at which filter processing is to be performed beyond the region, the filter processing unit 1206 performs normalization processing in such a manner that the total value of coefficients of the filter in the region is one.

<Effect of First Exemplary Embodiment>

As described above, the image processing apparatus according to the present exemplary embodiment is an image processing apparatus that corrects measurement values obtained by measuring a measurement image formed using recording elements that eject ink, in order to identify the density characteristics of the recording elements. The image processing apparatus acquires a scanned image with pixels each having a measurement value obtained by measuring the measurement image. The image processing apparatus acquires information identifying a boundary between regions in the scanned image that have different characteristics of measurement values from each other. Based on the acquired information identifying the boundary, the image processing apparatus corrects measurement values of the scanned image. This configuration reduces noise in the measurement values with high accuracy to identify the density characteristics of the recording elements even if the regions in the read data (scanned image) have the characteristics of the measurement values different from one another. This provides a highly accurate acquirement of the density characteristics of recording elements. In addition, the HS processing using the density characteristics of recording elements can reduce density unevenness and streaks in an image formed on a recording medium.
Modifications In step S803 in the above-described exemplary embodiment, filter processing using an average value filter is performed on measurement values. In other embodiments, another type of processing may be performed as long as filter processing can be performed on each divided region. For example, filter processing may be known filter processing that uses a Gaussian filter or a median filter, or known noise reduction processing that uses frequency transform such as Fourier transform or wavelet transform.

In the above-described exemplary embodiment, the scan resolution of a measurement image is 1200 dpi, which is the same as the resolution of the nozzle array of a recording head. The scan resolution may be higher or lower than the resolution of the nozzle array of a recording head. A higher scan resolution allows the density of each nozzle to be found more accurately. On the other hand, a lower scan resolution allows a smaller amount of data to be read, reducing cost whereas it becomes difficult to detect high-frequency unevenness. In addition, a measurement curve may be generated using an average value of the measurement values of a plurality of nozzles. This can reduce storage capacity for storing information regarding a measurement curve.

In the above-described exemplary embodiment, the description has been given of an example in which measurement values are corrected by filter processing each time an image is formed on a recording medium. Alternatively, measurement values of each divided region may be preliminarily corrected using a filter. In this case, the processing in steps S402 and S403 is preliminarily performed by the measurement value acquisition unit 1202 and the measurement value correction unit 1203, and the corrected measurement values are stored in the HDD 203. This configuration prevents correction processing from being performed each time image data is input, reducing density unevenness in an image while saving processing cost.

In the above-described exemplary embodiment, the description has been given of a case where discontinuous points of measurement values are generated due to a configuration of a recording head, but the occurrence cause of discontinuous points is not limited to this. For example, when the scanner 107 includes a combination of a plurality of measurement modules, a discontinuous point may be generated in measurement values due to a difference in characteristic between the measurement modules. In addition, when the scanner 107 includes a plurality of light sources used for scanning, a discontinuous point may be generated in measurement values due to the characteristic varying depending on the range on which light is projected by a light source. In both cases, the above-described filter processing on boundary portions in the apparatus configuration can be applied to measurement values.

In the above-described exemplary embodiment, in the filter processing on each divided region in step S803, the total value of coefficients of a filter is normalized. Alternatively, known end portion processing can also be applied. For example, processing such as padding of filling the outside of a region with a predetermined value, or mirroring of reflecting a measurement value at an end portion back may be performed.

A second exemplary embodiment will be described. In the above-described exemplary embodiment, each patch in a measurement image is formed using ink of a single color alone, and HS processing is performed for each ink color. However, with the single color HS processing, multi-color expressions with two or more sorts of color ink overlaid on one another may have color unevenness. To reduce such color unevenness, there is known a technique called multi-color shading (MCS) processing. In the present exemplary embodiment, the description will be given of processing that reduces density unevenness and streaks in an image with high accuracy even with step-like discontinuous points in measurement values used in MCS processing.

<Functional Configuration of Image Processing Apparatus>

FIG. 3B is a block diagram illustrating a functional configuration of an image processing apparatus 300 according to the present exemplary embodiment. Image data output from the input color conversion processing unit 303 is input to an MCS processing unit 310. The MCS processing unit 310 corrects the (R', G', B') printer color signal values of the input image data according to the density characteristic of a nozzle included in a recording head. The details of the MCS processing will be described below. The image data having the corrected (R", G", B") MCS color signal values is output to the ink color conversion processing unit 304. Similarly to the HS processing unit 305, the MCS processing unit 310 acquires measurement values obtained by preliminarily measuring patches. The functional configuration of the MCS processing unit 310 is similar to that of the HS processing unit 305, which is illustrated in FIG. 12.

A measurement image for MCS processing includes a plurality of patches having input signal values R, G, and B changed independently of one another. In the present exemplary embodiment, for R, G, and B, respectively, five types of tones, 0, 64, 128, 192, and 255, are set, and $5^3$ (=125)-pattern multi-color patches are formed. The combination of patches is not limited to this example. In the present exemplary embodiment, the processing of forming a measurement image for MCS processing passes along a bypass route 311 indicated by a broken line in FIG. 3B. With this configuration, a measurement image is an image corrected by the HS processing unit 305. The measurement image is scanned by the scanner 107, which produces a scanned image. Unlike the first exemplary embodiment, the pixel values of the scanned image are, which are not to be converted into values of one channel, are pixel values of three, (R, G, B), channels, the scanned image of which is then stored into the HDD 203.

<Processing Executed by Image Processing Apparatus>

Figure 11B:
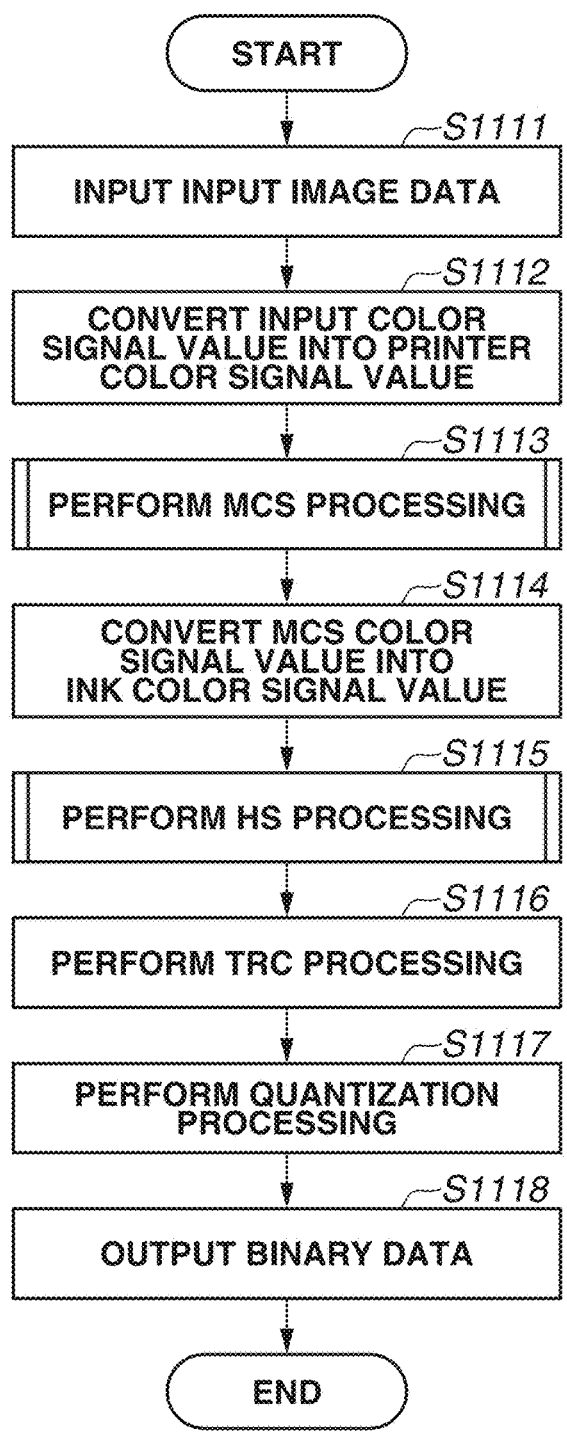

FIG. 11B is a flowchart illustrating processing executed by the image processing apparatus 300. The following is a detailed description of the processing executed by the image processing apparatus 300 with reference to FIG. 11B.

In step S1111, the input unit 301 inputs input image data and outputs the input image data to the image processing unit 302. In step S1112, the input color conversion processing unit 303 converts the input (R, G, B) color signal values of the input image data into (R', G', B') printer color signal values for the color reproduction range of the printer. In step S1113, the MCS processing unit 310 performs MCS processing on the image data having the (R', G', B') printer color signal values. In step S1114, the ink color conversion processing unit 304 converts the (R", G", B") MCS color signal values into (K, C, M, Y) ink color signal values suitable for a plurality of types of ink. In step S1115, the HS processing unit 305 performs HS processing on the image data having the (K, C, M, Y) ink color signal values. In step S1116, the TRC processing unit 306 performs TRC processing on the image data having the (K', C', M', Y') HS color signal values obtained by the HS processing. In step S1117, the quantization processing unit 307 performs quantization processing on the image data having the (K", C", M", Y") TRC color signal values obtained by the TRC processing. In step S1118, the output unit 308 outputs binary data generated by the quantization processing, to the image forming apparatus 100.

<MCS Processing>

Figure 9:
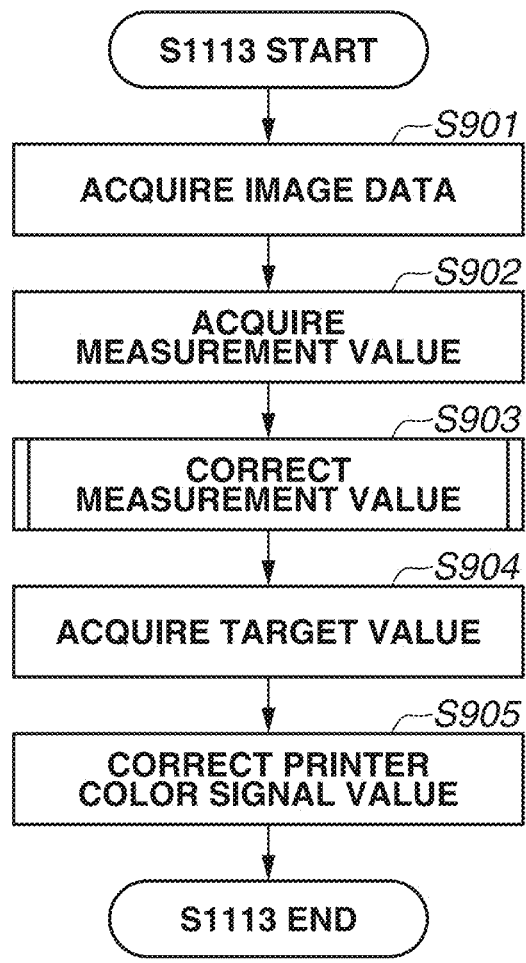
FIG. 9 is a flowchart illustrating multi-color shading (MCS) processing.

The following is a description of MCS processing with reference to FIG. 9. There are two major differences from HS processing: the measurement image illustrated in FIG. 5 is a multi-color measurement image, and measurement values are values of three, or (R, G, B) channels.

In step S901, the MCS processing unit 310 acquires image data having the (R', G', B') printer color signal values output by the input color conversion processing unit 303. In step S902, the MCS processing unit 310 acquires the measurement values at the nozzle position corresponding to a target pixel, from a scanned image. In the present exemplary embodiment, 125 (R, G, B) color signal values are acquired as measurement values of the 125 patches. The measurement values are acquired as image data by a measurement image being measured preliminarily using the scanner 107, and stored into the HDD 203.

In step S903, the MCS processing unit 310 corrects the measurement values. Similarly to the first exemplary embodiment, the correction processing is performed by the processing illustrated in FIG. 8. The correction processing according to the present exemplary embodiment is different from that according to the first exemplary embodiment in that filter processing on each divided region is performed for three, or (R, G, B), channels, respectively. In step S904, the MCS processing unit 310 acquires an (R, G, B) target value. In the present exemplary embodiment, an (R, G, B) target value is acquired by referring to an LUT (not illustrated) holding a corresponding relationship between (R', G', B') printer color signal values of the image data acquired in step S901 and (R, G, B) target values of the scanned image.

In step S905, based on the corrected measurement values, the MCS processing unit 310 corrects the (R', G', B') printer color signal values of the image data acquired in step S901, and acquires (R", G", B") MCS color signal values. The follow will describe a specific method of performing correction processing with reference to FIG. 10. FIG. 10 illustrates a three-dimensional color space having three axes corresponding to (R, G, B) color signal values of a scanned image. A target value 1001 indicates the target value acquired in step S904. In addition, values 1002, 1003, 1004, and 1005 are four corrected measurement values selected in such a manner as to form a smallest tetrahedron encompassing the target value 1001, from among the corrected 125 measurement values acquired in step S903. The MCS processing unit 310 calculates distances between the target value 1001 and the four corrected measurement values 1002 to 1005, and performs interpolation calculation with the four corrected measurement values in proportion with the ratios of the distances. A value obtained by the interpolation calculation is acquired as an (R", G", B") MCS color signal value of the target pixel.

<Effect of Second Exemplary Embodiment>

As described above, the image processing apparatus according to the present exemplary embodiment corrects measurement values in each divided region, and corrects color signal values of an image by MCS processing with the corrected measurement values. This configuration can reduce noise in measurement values for identifying the density characteristic of a recording element even with characteristics of measurement values different between regions in read data (scanned image). This therefore enables a high accurate acquirement of the density characteristic of a recording element. In addition, the MCS processing with the density characteristic of the recording element can reduce color unevenness in an image formed on a recording medium.

Other Exemplary Embodiments

In the above-described exemplary embodiment, the description has been given of an example where the PC 200 is operated as the image processing apparatus 300 by software installed on the PC 200. Alternatively, the image forming apparatus 100 may include the image processing apparatus 300. When the image processing apparatus 300 is included in the image forming apparatus 100, the image processing apparatus 300 may be operated as dedicated image processing circuitry that can carry out the functions of the image processing apparatus 300. In addition, the functions of the image processing apparatus 300 may be carried out by a server communicable with the image forming apparatus 100. In addition, a part of the image processing apparatus 300 may be the PC 200, and the other parts may be the image forming apparatus 100.

In the above-described exemplary embodiment, signal values of a measurement image are represented by an RGB color space, but any type of color space can be used. For example, the CIEXYZ color space or CIEL*a*b* color space may be used.

In the above-described exemplary embodiment, images are formed using four K, C, M, and Y color inks, but other types of ink may be used to form images. For example, image forming apparatus forming images with low-density inks such as light cyan, light magenta, or gray, or specific color inks such as red, green, blue, orange, or violet can be included in the above-mentioned exemplary embodiments. In addition, image forming apparatus with clear ink for controlling the gloss of a printed document, or reactive ink for improving fixability onto a recording medium can be included in the above-mentioned exemplary embodiments. In some cases, the configuration of a recording head that ejects clear or reactive ink differs from the configuration of a recording head for ejecting KCMY inks. In this case, the position of a boundary portion in a recording head that ejects clear or reactive ink may be acquired, separately from that in a recording head for ejecting KCMY inks.

In the above-described exemplary embodiments, the description has been given of an example in which processing is performed by the image processing unit 302 on image data input in an RGB format, which represents color signal values in three primary colors. Alternatively, image data in a KCMY format may be directly input to the image processing unit 302. This method cuts the processing of the input color conversion processing unit 303 and the processing of the ink color conversion processing unit 304 in the image processing unit 302.

The exemplary embodiments of the disclosure can also be implemented by a program for implementing one or more functions of the above-described exemplary embodiments being supplied to a system or an apparatus via a network or a storage medium and being read and run by one or more processors in a computer of the system or the apparatus. In addition, the exemplary embodiments of the disclosure can also be implemented by a circuit (e.g., an application specific integrated circuit (ASIC)) that implements one or more functions.

According to the exemplary embodiments of the disclosure, even with characteristics of measurement values different between regions in read data, the density characteristic of a recording element can be acquired with high accuracy.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-044446, filed Mar. 13, 2020, which is hereby incorporated by reference herein in its entirety.

What is claimed is:

1. An apparatus that corrects a measurement value obtained by measuring a first image formed using a recording element that ejects ink, to identify a density characteristic of the recording element, the apparatus comprising:
at least one processor; and
a memory coupled to the at least one processor storing instructions that, when executed by the processor, cause the processor to function as:
a first acquisition unit configured to acquire a second image obtained by measuring the first image;
an identification unit configured to identify a boundary between regions in the second image, each of the regions corresponding to one of a plurality of head modules including the recording element;
a first correction unit configured to correct a measurement value of the second image based on the identified boundary;
a second acquisition unit configured to acquire image data representing an image formed on a recording medium; and
a second correction unit configured to correct a signal value in the image data, based on the corrected measurement value.

2. The apparatus according to claim 1,
wherein a scanner that measures the first image includes a plurality of measurement modules, and
wherein the identification unit further identifies a boundary between regions in the second image, each of the regions corresponding to one of the plurality of measurement modules.

3. The apparatus according to claim 1,
wherein a scanner that measures the first image includes a plurality of light sources used in measuring an image, and
wherein the identification unit further identifies a boundary between regions in the second image, each of the regions corresponding to one of ranges in which a light source emits light.

4. The apparatus according to claim 1, wherein the first correction unit corrects the measurement value by filter processing.

5. The apparatus according to claim 4, wherein the first correction unit performs the filter processing on the measurement value of each of the regions.

6. The apparatus according to claim 4, wherein the processor further functions as a division unit configured to divide the second image based on the identified boundary,
wherein the first correction unit performs the filter processing on the measurement value in each of the divided regions.

7. The apparatus according to claim 1, wherein the first correction unit corrects the measurement value by noise reduction processing using frequency transform.

8. The apparatus according to claim 1, wherein the first correction unit corrects the measurement value for each ink included in an image forming apparatus.

9. The apparatus according to claim 1, wherein the first correction unit corrects the measurement value for each combination of ink included in an image forming apparatus.

10. The apparatus according to claim 1, wherein the processor further functions a third acquisition unit configured to acquire target characteristic data representing a target density characteristic of the recording element,
wherein the second correction unit corrects a signal value in the image data, based on a density characteristic of the recording element determined by the corrected measurement value, and the target density characteristic.

11. The apparatus according to claim 10, wherein the second correction unit uses, as density characteristic of the recording element, a curve generated through interpolation calculation with the corrected measurement value.

12. The apparatus according to claim 1, wherein the first image is a chart having a plurality of tones.

13. A system comprising:
an image forming apparatus including a recording element configured to eject ink;
at least one processor; and
a memory coupled to the at least one processor storing instructions that, when executed by the processor, cause the processor to function as:

a measurement unit configured to acquire a second image including pixels each having a measurement value obtained by measuring a first image formed by the image forming apparatus using the recording element; and an image processing unit configured to correct the measurement value in each of regions in the second image, each of the regions corresponding to one of a plurality of head modules including the recording element;

a second acquisition unit configured to acquire image data representing an image formed on a recording medium; and a second correction unit configured to correct a signal value in the image data, based on the corrected measurement value, wherein the image forming apparatus forms an input image corrected based on the corrected measurement value, onto a recording medium using the recording elements.

14. A method of correcting a measurement value obtained by measuring a first image formed using a recording element that ejects ink, to identify a density characteristic of the recording element, the method comprising:

acquiring a second image obtained by measuring the first image;

identifying a boundary between regions in the second image, each of the regions corresponding to one of a plurality of head modules including the recording element;

correcting a measurement value of the second image based on the identified boundary;

acquiring image data representing an image formed on a recording medium; and correcting a signal value in the image data, based on the corrected measurement value.

15. The method according to claim 14, further comprising measuring the first image includes a plurality of measurement modules, wherein the identifying further identifies a boundary between regions in the second image, each of the regions corresponding to one of the plurality of measurement modules.

16. The method according to claim 14, further comprising measuring the first image includes a plurality of light sources used in measuring an image, wherein the identifying further identifies a boundary between regions in the second image, each of the regions corresponding to one of ranges in which a light source emits light.

17. A non-transitory computer-readable storage medium storing instructions that, when executed by a computer, cause the computer to perform a method of correcting a measurement value obtained by measuring a first image formed using a recording element that ejects ink, to identify a density characteristic of the recording element, the method comprising:

acquiring a second image obtained by measuring the first image;

identifying a boundary between regions in the second image, each of the regions corresponding to one of a plurality of head modules including the recording element;

correcting a measurement value of the second image based on the identified boundary;

acquiring image data representing an image formed on a recording medium; and correcting a signal value in the image data, based on the corrected measurement value.

18. The non-transitory computer-readable storage medium according to claim 17, further comprising measuring the first image includes a plurality of measurement modules, wherein the identifying further identifies a boundary between regions in the second image, each of the regions corresponding to one of the plurality of measurement modules.

19. The non-transitory computer-readable storage medium according to claim 17, further comprising measuring the first image includes a plurality of light sources used in measuring an image, wherein the identifying further identifies a boundary between regions in the second image, each of the regions corresponding to one of ranges in which a light source emits light.

* * * * *